(12) United States Patent
Clapie

(10) Patent No.: US 7,410,209 B2
(45) Date of Patent: Aug. 12, 2008

(54) SUPPORT FOR THE FRONT MODULE OF A MOTOR VEHICLE AND ASSEMBLY METHOD

(75) Inventor: Yann Clapie, Etting (DE)

(73) Assignee: Faurecia Kunststoffe Automobilsysteme GmbH, Ingolstadt (DE)

( * ) Notice: Subject to any disclaimer, the term of this patent is extended or adjusted under 35 U.S.C. 154(b) by 400 days.

(21) Appl. No.: 11/371,261

(22) Filed: Mar. 8, 2006

(65) Prior Publication Data

US 2006/0250899 A1 Nov. 9, 2006

(30) Foreign Application Priority Data

Mar. 18, 2005 (DE) .................. 10 2005 013 107

(51) Int. Cl.
*B60J 7/00* (2006.01)

(52) U.S. Cl. .................. 296/193.09; 293/102; 293/155

(58) Field of Classification Search ............ 296/193.09, 296/193.11, 187.09; 293/102, 155
See application file for complete search history.

(56) References Cited

FOREIGN PATENT DOCUMENTS

| | | |
|---|---|---|
| DE | 19946995 | 4/2000 |
| DE | 60000006 T | 8/2000 |
| DE | 10228464 A1 | 1/2004 |
| EP | 1024075 | 8/2000 |
| EP | 1036730 | 9/2000 |
| EP | 1232932 | 8/2002 |
| FR | 2809061 | 11/2001 |

OTHER PUBLICATIONS

European Search Report of European Application 06101015.3-1268.

*Primary Examiner*—Joseph D Pape
(74) *Attorney, Agent, or Firm*—Matthew B. Dernier

(57) ABSTRACT

The invention relates to a support for a front module of a motor vehicle comprising a first support part for connection to a chassis of the motor vehicle and left and right brackets, wherein the left and right brackets are configured to receive a headlight unit and for connection to a bumper of the motor vehicle, respectively, wherein the left and right brackets with the left and right elastic elements are connected to the first support part, and comprising structure for fixing the elastic elements relative to the chassis when the elastic elements have assumed an assembly position following elastic deformation.

15 Claims, 4 Drawing Sheets

SUPPORT FOR THE FRONT MODULE OF A MOTOR VEHICLE AND ASSEMBLY METHOD

BACKGROUND

The invention relates to a support for the front module of a motor vehicle and a method for mounting such a support.

In the state of the art, various front modules and assembly methods for front modules are disclosed.

EP 1 232 932 A1, which is the closest state of the art of the invention, discloses a support for the front module of a motor vehicle comprising a support part for connecting it to the fenders and the chassis of the motor vehicle (see the parts 7 and 13 in FIGS. 1 and 2 of EP 1 232 932 A1). A bracket for receiving a headlight unit (optical unit) and for connection to a bumper is fastened to the support (see the bracket 43, the optical unit 21, the bumper 19 and the guide 45 for fastening the bracket to the support, as is illustrated in the figures of EP 1 232 932 A1).

In the prior art known from EP 1 232 932 A1 the problem occurs that due to the relatively large dimensional tolerances of the body shell of a motor vehicle body, to which the front module needs to be mounted, difficulty relating to the fit may occur during assembly. The joint pattern, particularly with respect to the joints between the bumper and the headlight unit and between the headlight unit and the hood as well as between the bumper and the hood, may therefore be impaired.

Additional similar front panels are revealed in FR 2 809 061 and DE 199 46 995 A1. Additionally, DE 600 00 006 T2 discloses a frontal assembly for a vehicle comprising a support structure and a headlight, wherein the headlight is rotatably mounted on the support structure between a pre-assembly position and a final assembly position about a slanted axis. EP 1 036 730 A2 reveals a method for precision-mounting front parts of a motor vehicle. To this end, a multitude of mutually influencing tolerances can be taken into consideration.

SUMMARY OF THE INVENTION

By contrast, it is the object of the invention to provide an improved support for the front module of a motor vehicle, a front module as well as an improved assembly method for the front module of a motor vehicle.

The objects of the invention are achieved with the characteristics of the independent patent claims. Preferred embodiments of the invention are revealed in the dependent claims.

The invention creates a support for the front module of a motor vehicle comprising a first support part for connection to a motor vehicle chassis and left and right brackets, wherein the left and right brackets are configured for receiving a headlight unit and for connection to a bumper of the motor vehicle, respectively. According to the invention, the brackets are connected to the first support part by means of elastic elements. Furthermore means for fixing the elastic elements relative to the chassis are provided, when the elastic elements have assumed an assembly position following elastic deformation.

The elastic elements of the inventive support allow for tolerance compensation during the installation of the front module. This way, a high-quality joint pattern can be achieved despite the relatively large dimensional tolerances of the body shell of a motor vehicle, which may be in the millimeter range. Complex adjustments during assembly are therefore eliminated.

According to one embodiment of the invention, the elastic elements are fixed to the first support part or the chassis by means of a screw connection after the front module has been brought into the installation position and is subject to deformation forces there. Due to the fixation, the elastic elements maintain this deformation position, even when the deformation forces are no longer applied.

According to one embodiment of the invention, the elastic elements comprise a support surface for the hood of a motor vehicle so that the deformation forces act upon the elastic elements when the hood is closed. By closing the hood, the deformation forces thus act substantially in the vertical direction upon the elastic elements and deforms them. The elastic elements are fixed in this deformation position.

According to one embodiment of the invention, the elastic elements are configured such that in any case deformation forces are applied by the hood on the elastic elements when the hood is closed, while taking the dimensional tolerances of the motor vehicle body shell and the hood into consideration. To this end, the elastic elements can be configured such that they protrude slightly upward in the direction of the hood.

According to one embodiment of the invention, the elastic elements have a parallelogram shape. The sides of the elastic elements located on top each other preferably form an angle of >90° prior to any deformation. This way, the elastic elements protrude slightly upward, so that deformation forces are definitely applied on the elastic elements when closing the hood.

According to one embodiment of the invention, one side of a pair of sides of the elastic elements is connected to the first support part. The opposing second side of this pair of sides serves the connection to one of the brackets. By contrast, one side of the other pair of sides serves the introduction of the deformation forces.

According to one embodiment of the invention, a holder for a screw connection is disposed on the parallelogram-like elastic elements, respectively, in order to fix the elastic elements in their deformed position.

According to another embodiment of the invention, the brackets are fastened to the first support part by means of additional elastic elements, wherein for an elastic deformation the other elastic elements are configured substantially perpendicular to the direction of the elastic deformation of the elastic elements. This way, further compensation of the tolerances, for example in the lateral, i.e. the y direction, can be created. One of the other elastic elements can be disposed, for example, between one of the brackets and the elastic element and/or between the elastic element and the first support part.

The invention furthermore relates to a front module for a motor vehicle comprising a support according to the invention, a bumper fastened thereon and headlight units.

The invention also relates to a method for installing a support for a front module, comprising the following steps: installation of a first support part of the support on the chassis of the motor vehicle; elastic deformation of an elastic element of the support by closing a hood of the motor vehicle; and fixing the elastic element in the deformed position.

According to one embodiment of the invention, the elastic element is fixed to the support part of the support or to the chassis in the deformed position by means of a screw connection.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown. The invention will be explained in more detail hereinafter with reference to the drawings, wherein.

DETAILED DESCRIPTION OF THE INVENTION

Figure 1:
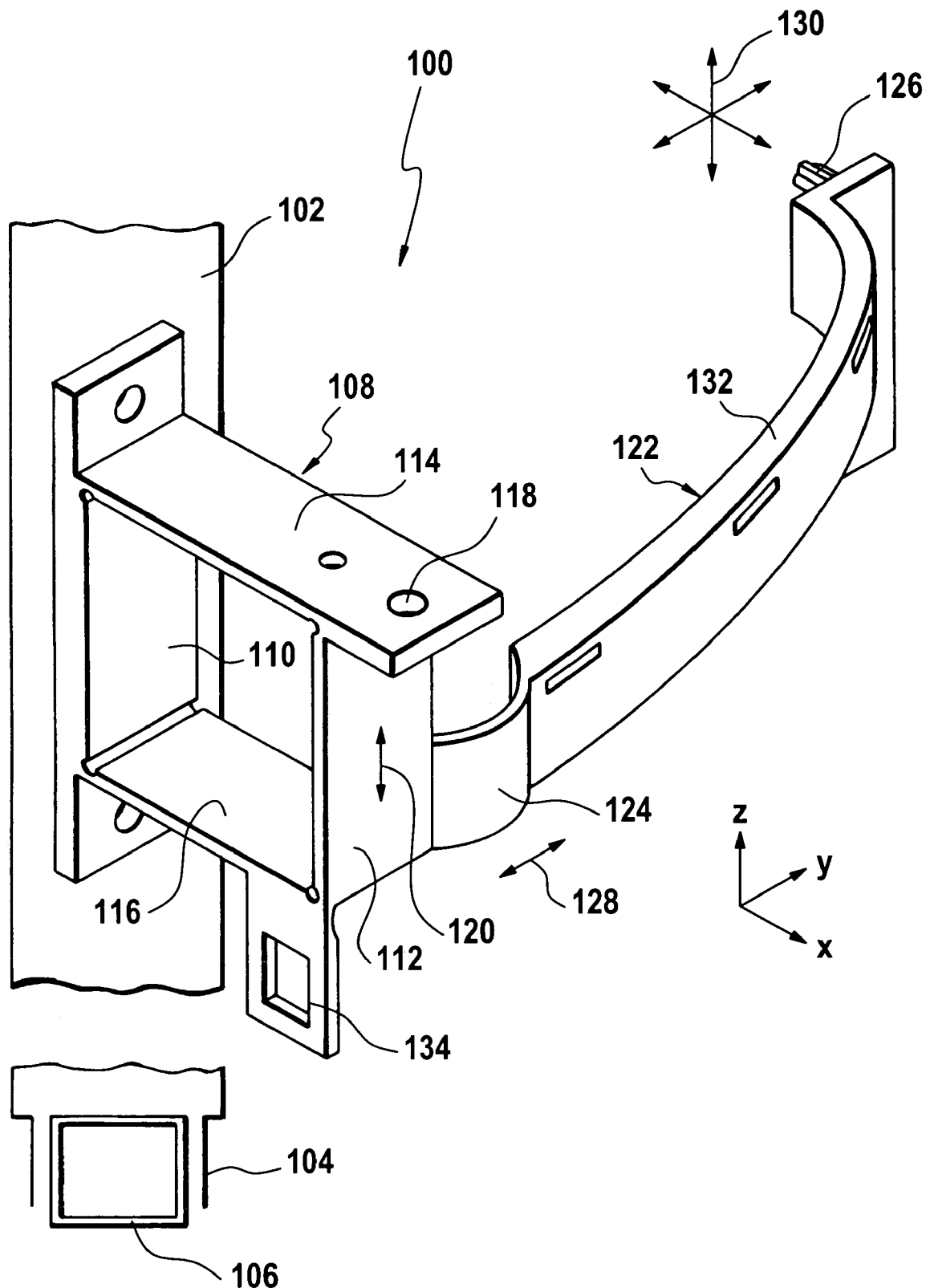
FIG. 1 is a schematic perspective view of a first embodiment of a support according to the invention.

FIG. 1 shows a support 100 for a front module of a motor vehicle (the front module is not shown in FIG. 1). The support 100 comprises a support part 102. The support part 102 serves as the connection of the support 100 to the chassis of the motor vehicle. To this end, the support part 102 comprises a mount 104 for example on its lower end for connection to a longitudinal support 106 of the motor vehicle.

An elastic element 108 is disposed on the support part 102. The elastic element 108 has a parallelogram configuration in the embodiment shown here. The elastic element 108 comprises substantially parallel legs 110, 112 and 114, 116. The elastic element 108 is firmly connected to the support part 102 via the side 110, for example by means of a screw connection. The side 114 of the elastic element 108 comprises a support surface 118 for introducing deformation forces substantially in the vertical direction, i.e. the z direction. The elastic element 108 can be deformed in the direction of the arrow 120 through such deformation forces.

A bracket 122 is fastened to the side 112 of the elastic element 108 by means of another elastic element 124. The elastic element 124 allows tolerance compensation substantially in the lateral, i.e. y direction, as is indicated by the arrow 128. At the end, the bracket 122 comprises a positioning pin 126 for engaging in an assembly hole of a fender. Since the bracket 122 has a certain elasticity, the positioning pin 126 has various degrees of freedom, as is illustrated by the arrows 130 in FIG. 1, so that the positioning pin 126 can be introduced easily in a corresponding assembly hole on the fender side. Tolerance compensation in the y direction is ensured by the elastic element 124, by means of which the bracket 122 is fastened to the elastic element 108. The bracket 122 serves the accommodation of a headlight unit (not shown in the figures) as well as the fastening of a bumper (see FIG. 4). Both the headlight unit and the bumper are fastened thereon in relation to an upper edge 132 of the bracket 122 in order to achieve a high-quality joint pattern.

In a position that is removed from the side 110—in the embodiment shown here on the bottom of the side 116—the elastic element 108 comprises a holder 134 for an assembly screw. After the support part 102 has been pre-assembled to the chassis, i.e. for example mounted to the longitudinal support 106, of the motor vehicle and the bracket 120 has been pre-assembled to one of the fender sides by means of the positioning pin 126, a hood (see FIG. 4) of the motor vehicle is closed in order to apply deformation forces on the support surface 118. As a result, the elastic element 108 is deformed in the z direction.

In this deformed position, a screw connection is tightened through the holder 134 in order to fix the elastic element in the deformed position. The holder 134 can be screwed to the support part 102 or to a part of the chassis of the motor vehicle, for example. As a result, tolerance compensation in the z direction can be achieved, so that a high-quality joint pattern can be implemented in relation to the hood, without the otherwise frequently required adjustment of the locking device for the hood and/or other adjustments.

FIG. 1 illustrates for clarity reasons only the right side of the support with the right elastic element 108 and the right bracket 122. The support part 102 extends to the left side of the vehicle and comprises there a corresponding left elastic element and left bracket, which are disposed symmetrically to the components shown in FIG. 1.

The support part 102 is made of metal or a hybrid material, for example. The elastic element 108 and the bracket 122 are preferably injection-molded parts, made of polypropylene or polyethylene for example.

Figure 2:
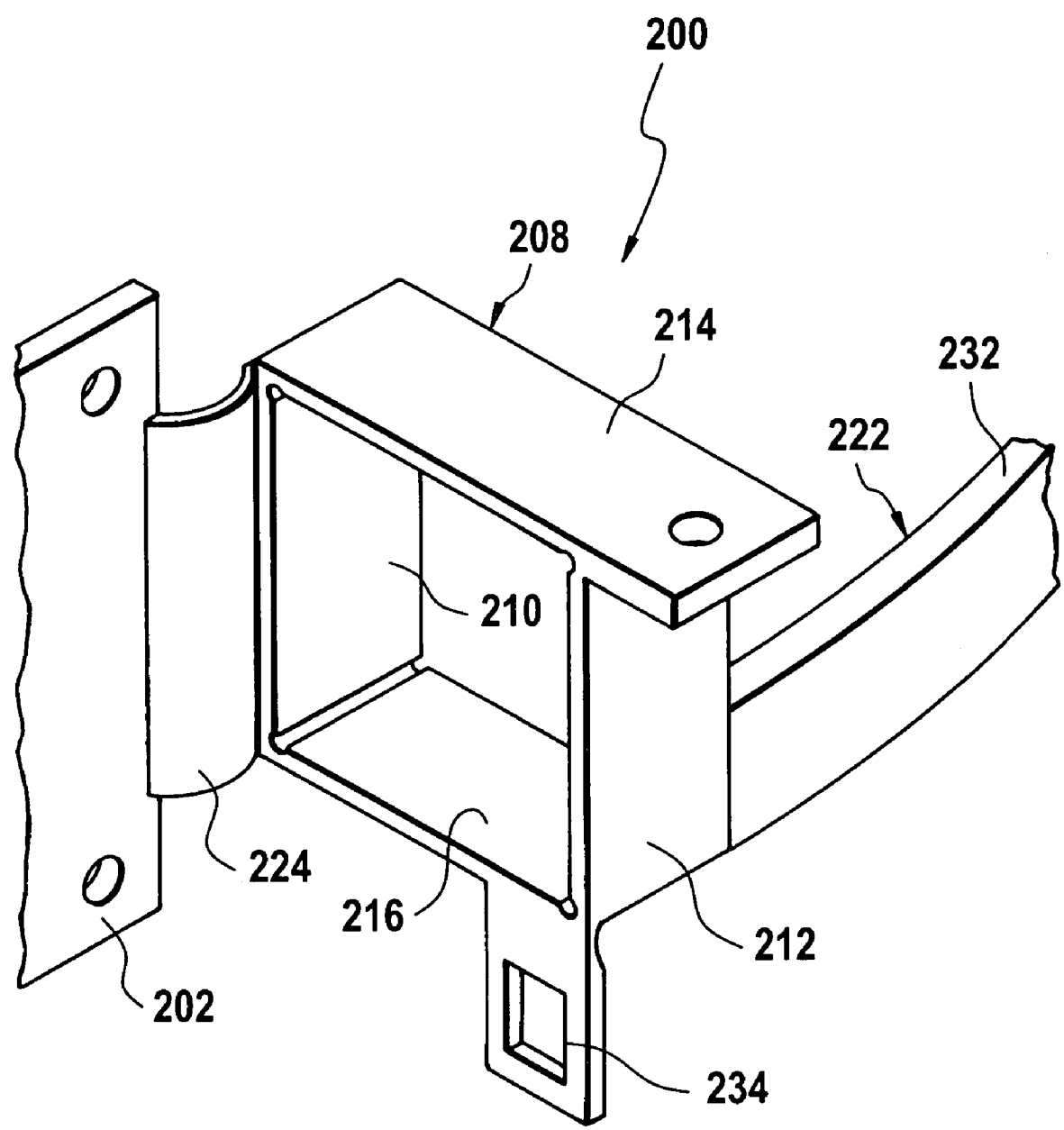
FIG. 2 is a perspective view of a second embodiment.

FIG. 2 shows another embodiment. Elements from FIG. 2 that correspond to elements from FIG. 1 have been marked with a reference numeral that has been increased by 100. In the embodiment of FIG. 2, the elastic element 224 connects the support part 202 and the elastic element 208. This is an alternative to the configuration of the corresponding elastic element 124 according to the embodiment from FIG. 1.

Figure 3:
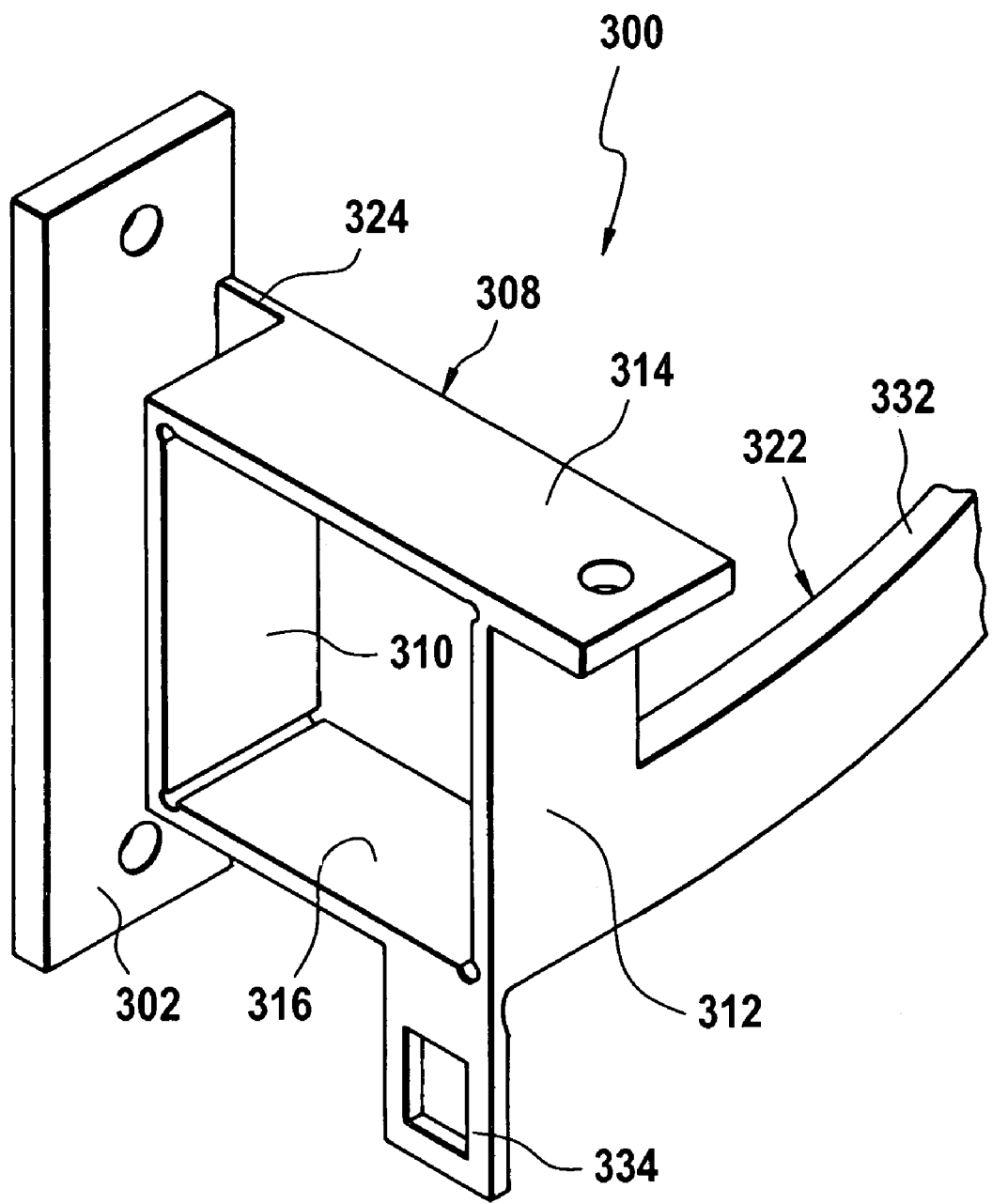
FIG. 3 is a perspective view of a third embodiment.

FIG. 3 shows another embodiment of the configuration of the elastic element 324. Elements from FIG. 3 that correspond to elements from FIG. 2 have been marked accordingly with a reference numeral that has been increased by another 100.

Figure 4:
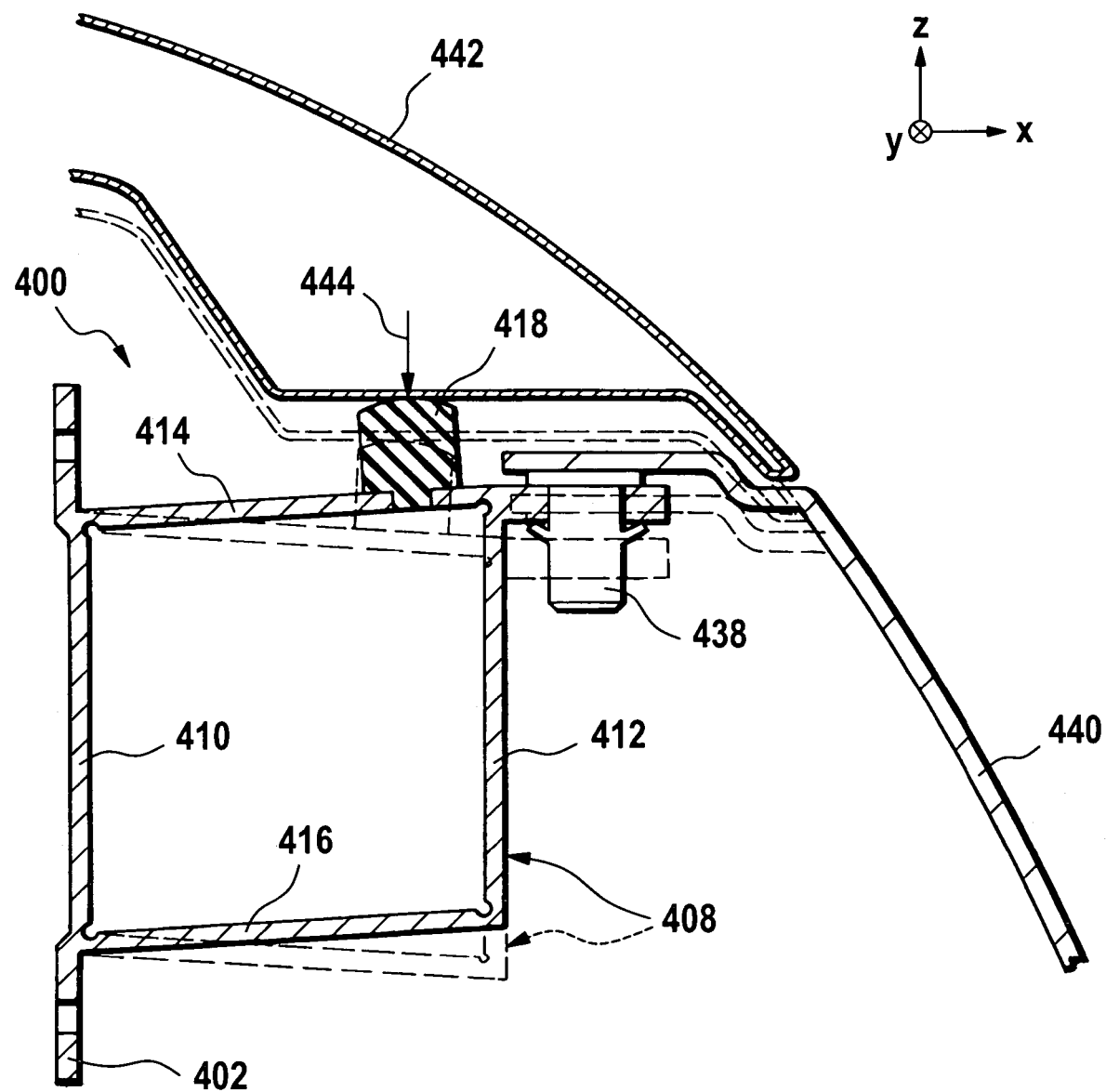
FIG. 4 is a sectional view of another embodiment of the support during installation in a motor vehicle.

FIG. 4 shows another embodiment of the inventive support 400. Elements of the embodiment from FIG. 4 that correspond to elements of the embodiments from FIGS. 1, 2 and/or 3 have been marked with an accordingly higher reference numeral. FIG. 4 illustrates the support 400 in the non-deformed state as well as following the deformation, which is shown with dotted lines.

On the upper side 414 of the support 400 a support element 418 is disposed, which is made of rubber or plastic, for example. A bumper 440 is fastened to the elastic element 408 and/or to the bracket, which is not shown in FIG. 4, by means of a fastening element 438. Pre-assembly of the support 400 takes place with an open hood 442 of the motor vehicle. After the support 400 with the support part 402 has been pre-assembled to the chassis of the motor vehicle, the hood 442 is closed, thus allowing it to apply deformation forces 444 onto the elastic element 408 via the support element 418. As a result of these deformation forces, the elastic element 408 is moved into the dotted deformed position. The elastic element 408 is fixed in this position, for example by means of a suitable screw connection (see for example the holders 134, 234 and 334 in FIG. 1, 2 or 3).

In the non-deformed position, the sides of the elastic element 408 located on top of each other, i.e. sides 410 and 414 enclose an angle that is greater than 90 degrees so that the side 414 protrudes slightly upward. This ensures that the elastic element 408 is definitely deformed when closing the hood 442.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

REFERENCE NUMERAL LIST

100 Support
102 Support Part
104 Mount
106 Longitudinal Support
108 Elastic Element
110 Side
112 Side
114 Side
116 Side
118 Support Surface
120 Direction of Arrow
122 Bracket
124 Elastic Element
126 Positioning Pin
128 Arrow 130 Arrow
132 Upper Edge
134 Holder
200 Support
202 Support Part
208 Elastic Element
210 Side
212 Side
214 Side
216 Side
222 Bracket
224 Elastic Element
232 Upper Edge
234 Holder
300 Support
302 Support Part
308 Elastic Element
310 Side
312 Side
314 Side
316 Side
322 Bracket
324 Elastic Element
332 Upper Edge
334 Holder
400 Support
402 Support Part
408 Elastic Element
410 Side
412 Side
414 Side
416 Side
418 Support Element
438 Fastening Element
440 Bumper
442 Hood
444 Deformation Forces

The invention claimed is:

1. A support for a front module of a motor vehicle, comprising:
a first support part for connection to a chassis of the motor vehicle; and
left and right brackets, the left and right brackets being configured to receive a headlight unit and for connection to a bumper of the motor vehicle, respectively,
wherein the left and right brackets with left and right elastic elements are connected to the first support part, and comprising means for fixing the elastic elements relative to the chassis when the elastic elements have assumed an assembly position following elastic deformation.

2. A support according to claim 1, wherein the fixing means is configured to create a screw connection.

3. A support according to claim 1, wherein the fixing means is configured to create a connection to the first support part.

4. A support according to claim 1, comprising means for introducing deformation forces onto the elastic elements in the assembly position.

5. A support according to claim 4, wherein the means for introducing the deformation forces comprise a support element for a hood of the motor vehicle so that the deformation forces can act upon the elastic elements when the hood is closed.

6. A support according to claim 1, wherein the elastic elements have a parallelogram configuration.

7. A support according to claim 6, wherein the sides located on top of each other of the parallelogram elastic element enclose an angle of >90° prior to deformation.

8. A support according to claim 6, wherein:
each of the elastic elements comprises first and second substantially parallel pairs of sides;
a first side of a first pair of sides connects the respective elastic element to the first support part, and a second side of the first pair of sides connects the elastic element to one of the brackets; and
a first side of a second pair of sides is configured to introduce the deformation forces from the hood.

9. A support according to claim 8, wherein the first side of the second pair of sides comprises a support surface for the hood.

10. A support according to claim 8, wherein in a position that is removed from the first side of the first pair of sides a holder for a screw connection is disposed on the elastic element for fixing the elastic element following the elastic deformation.

11. A support according to claim 1, comprising second elastic elements for fastening the brackets to the first support part, wherein the second elastic elements are configured for the elastic deformation in a direction that is substantially parallel to the direction of the elastic deformation of the left and right elastic elements.

12. A support according to claim 11, wherein at least one of the second elastic elements is configured to connect one of the brackets to the left or right elastic element.

13. A support according to claim 11, wherein at least one of the second elastic elements is configured to connect the left or right elastic element to the first support part.

14. A front module for a motor vehicle comprising a support, the support comprising:
a first support part for connection to a chassis of the motor vehicle; and
left and right brackets, the left and right brackets being configured to receive a headlight unit and for connection to a bumper of the motor vehicle, respectively,
wherein the left and right brackets with left and right elastic elements are connected to the first support part, and comprising means for fixing the elastic elements relative to the chassis when the elastic elements have assumed an assembly position following elastic deformation.

15. A method for installing a support for a front module of a motor vehicle, wherein the support comprises a first support part for connection to a chassis of the motor vehicle and left and right brackets, wherein the left and right brackets are configured to receive a headlight unit and for connection to a bumper of the motor vehicle, comprising the steps of:
installing the first support part on the chassis of the motor vehicle;
elastically deforming the support by closing a hood of the motor vehicle; and
fixing the support in the resulting deformed position.

* * * * *